US012724013B2

(12) United States Patent
Fujita et al.

(10) Patent No.: US 12,724,013 B2
(45) Date of Patent: Sep. 1, 2026

(54) DATA PROCESSING SYSTEM

(71) Applicant: SHIMADZU CORPORATION, Kyoto (JP)

(72) Inventors: Yuichiro Fujita, Kyoto (JP); Akira Nishio, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 576 days.

(21) Appl. No.: 18/111,691

(22) Filed: Feb. 20, 2023

(65) Prior Publication Data

US 2023/0324350 A1 Oct. 12, 2023

(30) Foreign Application Priority Data

Apr. 6, 2022 (JP) ................................ 2022-063252

(51) Int. Cl.
*G01N 30/86* (2006.01)
*G06T 7/00* (2017.01)
*G06V 20/69* (2022.01)

(52) U.S. Cl.
CPC ..... *G01N 30/8631* (2013.01); *G01N 30/8693* (2013.01); *G06T 7/0002* (2013.01); (Continued)

(58) Field of Classification Search
CPC ............ G01N 30/8631; G01N 30/8693; G06T 7/0002; G06T 2207/10061; G06V 20/69; G06V 20/698
See application file for complete search history.

(56) References Cited

U.S. PATENT DOCUMENTS

2014/0257712 A1* 9/2014 Mito ...................... G01N 30/74 702/25
2016/0224830 A1* 8/2016 Noda ................ G01N 30/8634
(Continued)

FOREIGN PATENT DOCUMENTS

WO 2016/035167 A1 3/2016
WO WO-2021261202 A1 * 12/2021 ............ G06N 20/00

OTHER PUBLICATIONS

Office Action for corresponding Chinese Patent Application No. 202310097732.6 dispatched Jun. 21, 2025, with machine translation.

*Primary Examiner* — Christian T Bryant
(74) *Attorney, Agent, or Firm* — Renner, Otto, Boisselle & Sklar, LLP

(57) ABSTRACT

A data processing system includes an original data storage part (2) that stores original data of a three-dimensional chromatogram including chromatogram data and a spectrum acquired by chromatography analysis, an arithmetic processor (4) configured to execute peak estimation processing of estimating peaks included in a peak waveform portion of the original data stored in the original data storage part by repeating a component estimation step of estimating a three-dimensional chromatogram of one peak component included in the peak waveform portion until synthesis data obtained by synthesizing three-dimensional chromatograms of all estimated peak components of which three-dimensional chromatograms are estimated in the component estimation step approximates the original data, and a maximum number storage part (6) that stores a maximum number of the estimated peak components. The arithmetic processor (4) is configured to end the peak estimation processing regardless of situation of an approximation of the synthesized data with respect to the original data when the number (Continued)

of the estimated peak components reaches the maximum number.

3 Claims, 4 Drawing Sheets

(52) U.S. Cl.
CPC .... *G06T 2207/10061* (2013.01); *G06V 20/69* (2022.01); *G06V 20/698* (2022.01)

(56) References Cited

U.S. PATENT DOCUMENTS

2016/0238575 A1* 8/2016 Kozawa ............ G01N 30/8631
2017/0336370 A1 11/2017 Noda

* cited by examiner

COMPARATIVE EXAMPLE

EXAMPLE OF PRACTICE

DATA PROCESSING SYSTEM

BACKGROUND OF THE INVENTION

1. Field of the Invention

The present invention relates to a data processing system that processes three-dimensional chromatogram data.

2. Description of the Related Art

In a liquid chromatograph (LC) using a multichannel detector such as a photodiode array (PDA) detector, three-dimensional chromatogram data having three dimensions of time, wavelength, and signal intensity (absorbance) can be obtained by continuously acquiring an absorption spectrum of a sample eluted from an analysis column.

In a case where a target component in a sample is quantified using a liquid chromatograph, in general, a chromatogram is created using a wavelength at which the absorbance of the target component is the largest, and an area value of a peak of the target component is obtained on the chromatogram to perform quantification. However, a sample may contain an impurity other than the target component, and a peak of the impurity may overlap a peak of the target component and form one peak waveform portion. In such a case, it is not possible to obtain a peak area value of the target component or the impurity with one peak waveform portion formed by a plurality of peaks overlapping each other, and thus it is necessary to estimate what kind of peak overlaps to form the peak waveform portion.

As an algorithm for automatically estimating a plurality of peaks included in a peak waveform portion, an algorithm for applying a peak model function such as an Exponential Modified Gaussian (EMG) function to a waveform of a chromatogram while adjusting a parameter of the peak model function is known (see WO 2016/035167 A). The algorithm disclosed in WO 2016/035167 A includes a component number automatic estimation function that automatically estimates the number of components of peaks included in a target peak waveform portion by repeating processing of estimating a three-dimensional chromatogram for a component of each peak included in the peak waveform portion and adding one to the number of peaks if a loss (a value representing degree of approximation to original data of a three-dimensional chromatogram of synthesis data obtained by synthesizing a chromatogram and a spectrum of an estimated peak component, where as this value is smaller, the original data can be evaluated to be approximated more) of an estimation result is a predetermined value or more.

SUMMARY OF THE INVENTION

Analysis using the algorithm having the above component number automatic estimation function can be executed for an optional analysis target range (wavelength range and retention time range), but the number of estimated peak components may change as the analysis target range is slightly changed. Such a phenomenon is mainly caused by magnitude of a noise component included in data in the analysis target range, and it is difficult to solve the phenomenon by correction of the algorithm or the like.

Further, when an algorithm such as one described above is used, it is possible to quantify not only peaks of a main component and an accessory component contained in a sample but also an impurity peak having a concentration much lower than that of the main component and the accessory component, but conversely, it is not possible to cope with a case where it is desired to quantify only a main component and an accessory component while ignoring an impurity.

The present invention has been made in view of the above problem, and an object of the present invention is to prevent presence of an unnecessary peak component from being estimated while causing a component number automatic estimation function to function effectively.

A data processing system according to the present invention includes an original data storage part that stores original data of a three-dimensional chromatogram including chromatogram data and a spectrum acquired by chromatography analysis, an arithmetic processor configured to execute peak estimation processing of estimating peaks included in a peak waveform portion of the original data stored in the original data storage part by repeating a component estimation step of estimating a three-dimensional chromatogram of one peak component included in the peak waveform portion until synthesis data obtained by synthesizing three-dimensional chromatograms of all estimated peak components of which a three-dimensional chromatograms are estimated in the component estimation step approximates the original data, and a maximum number storage part that stores a maximum number of the estimated peak components. The arithmetic processor is configured to end the peak estimation processing regardless of situation of approximation of the synthesized data with respect to the original data when the number of the estimated peak components reaches the maximum number.

That is, the data processing system according to the present invention is a system that executes the peak estimation processing of estimating the number of peak components included in a peak waveform portion and a three-dimensional chromatogram of each peak component. In the peak estimation processing, in principle, the component estimation step of estimating three-dimensional chromatograms of peak components included in a peak waveform portion is repeatedly executed until synthesis data obtained by synthesizing three-dimensional chromatograms of all estimated peak components of which three-dimensional chromatograms are estimated in the component estimation step approximates the original data. On the other hand, the maximum number of the estimated peak components is set and when the number of the estimated peak components reaches the set maximum number, the peak estimation processing is ended regardless of an approximate state to the original data by the synthesis data of the estimated peak components.

For example, when analysis is performed on a data range (peak waveform portion) in which presence of three peak components is estimated by an existing algorithm having a component number automatic estimation function, if the maximum number of the estimated peak components is set to two, the peak estimation processing is ended without executing the next component estimation step when the number of the estimated peak components reaches two. In this case, synthesis data of the three-dimensional chromatograms of the two estimated peak components may include a loss of one or more peak components for the original data in the same range, but such a loss is ignored. This is particularly effective in a case where it is known in advance that a sample contains three components of a main component, an accessory component, and an impurity, but it is desired to quantify only the main component and the accessory component while ignoring presence of the impurity. Conversely, when the maximum number of the estimated peak components is set to three in a case where analysis is made on a peak waveform portion in which presence of two peak components is estimated by an existing algorithm, presence of three peak components is not estimated, a component number automatic estimation function effectively functions similarly to the existing algorithm, and the presence of two peak components is estimated. This is clearly different from a configuration that forcibly estimates peak components as many as the number designated by the user to be present in a designated peak waveform portion.

Here, the peak waveform portion means a portion where one or more peaks are combined to form one peak waveform. Further, that the synthesis data approximates the original data means that the synthesis data is in a state of being able to be evaluated to be approximate to the original data as a difference between the synthesis data and the original data obtained by the least squares method or the like satisfies a predetermined condition. An example of the predetermined condition is that a difference between the synthesis data and the original data is equal to or less than a predetermined threshold.

As described above, the data processing system according to the present invention includes a component number automatic estimation function for automatically estimating the number of peak components included in a designated peak waveform portion by repeating the component estimation step, and is configured to end the peak estimation processing when the number of times of execution of the component estimation step reaches the set maximum number of times regardless of an approximate state to the original data by the synthesis data of the estimated peak components. Therefore, it is possible to prevent presence of an unnecessary peak component from being estimated in data in an analysis target range while allowing the component number automatic estimation function to function effectively.

BRIEF DESCRIPTION OF THE DRAWINGS

FIG. 4A illustrates a case where the maximum number of estimated peak components is not set (comparative example), and FIG. 4B illustrates a case where the maximum number of estimated peak components is set (example of practice).

DETAILED DESCRIPTION OF THE INVENTION

Hereinafter, an example of a data processing system according to the present invention will be described with reference to the accompanying drawings.

Figure 1:
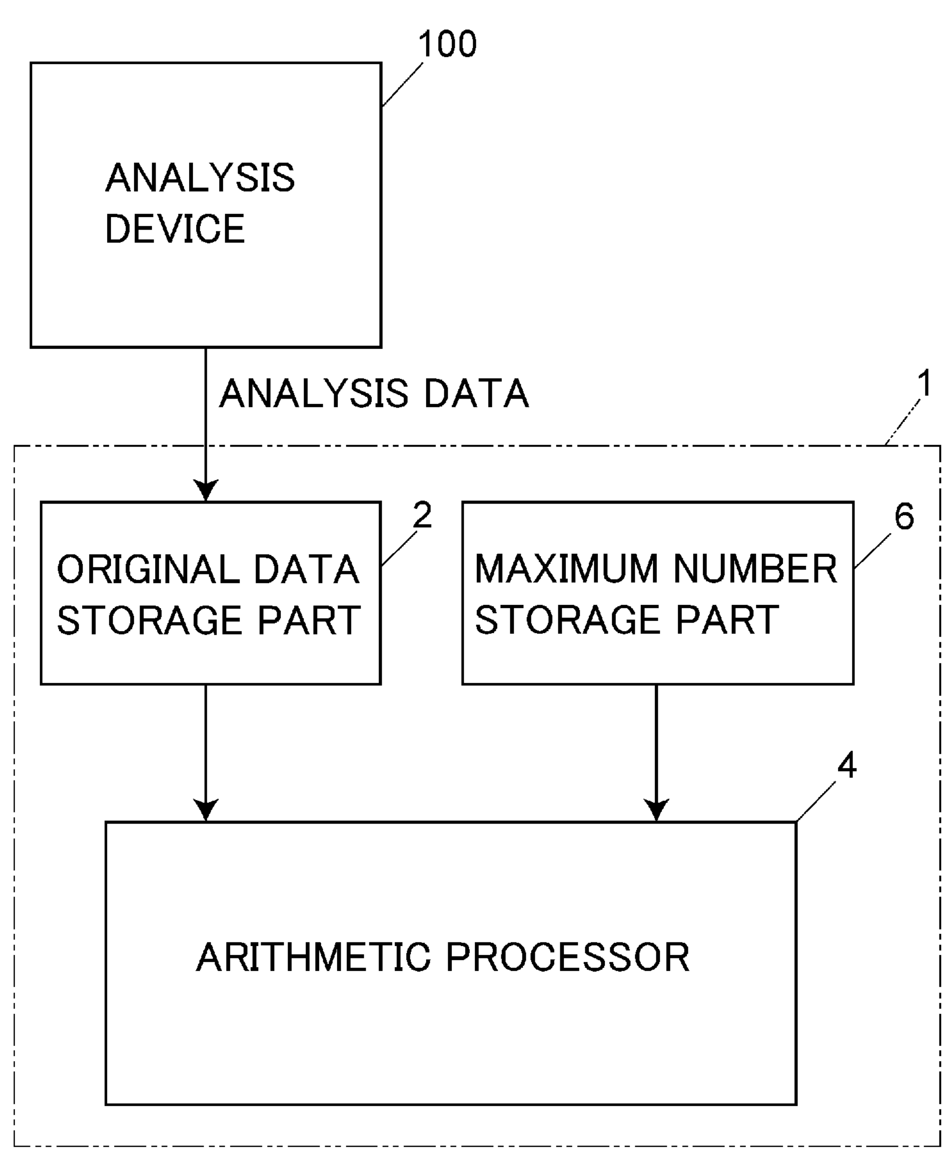
FIG. 1 is a block diagram schematically illustrating an example of a data processing system.

FIG. 1 illustrates an example of the data processing system.

The data processing system 1 includes an original data storage part 2, an arithmetic processor 4, and a maximum number storage part 6. Analysis data acquired by an analysis device 100 is taken into the data processing system 1. The analysis device 100 is configured to perform liquid chromatography analysis on a sample to acquire an absorbance spectrum at regular time intervals. That is, the analysis data taken into the data processing system 1 from the analysis device 100 is data of a three-dimensional chromatogram including a chromatogram and a spectrum.

The original data storage part 2 is a storage area for storing data (hereinafter, original data) of a three-dimensional chromatogram taken in from the analysis device 100. The original data storage part 2 can be realized by a non-volatile flash memory, a hard disk drive, or the like.

The arithmetic processor 4 is configured to perform analysis processing of the original data of a three-dimensional chromatogram stored in the original data storage part 2. The analysis processing of the original data by the arithmetic processor 4 includes, in addition to quantitative processing of quantifying concentration of a component contained in a sample from an area value of a peak on a chromatogram of the original data, peak estimation processing of estimating the number of peak components included in a peak waveform portion in a designated analysis target range and a three-dimensional chromatogram of each peak component. The arithmetic processor 4 is a function realized by a program executed in a computer circuit including a central PROCESSOR (CPU).

The maximum number storage part 6 is a storage area that stores a set value of the maximum number of peak components (estimated peak components) estimated to be included in a designated peak waveform portion in the peak estimation processing. The maximum number of the estimated peak components can be optionally set by the user.

Figure 2:
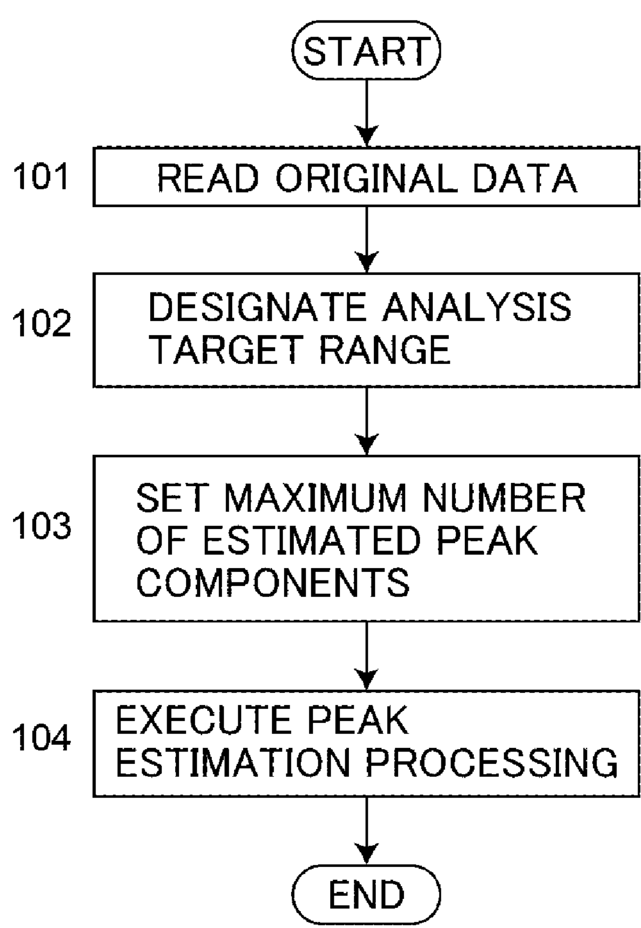
FIG. 2 is a flowchart for describing a series of processes related to peak estimation processing.

A series of processes related to the peak estimation processing will be described with reference to FIG. 1 and a flowchart of FIG. 2.

First, when the user designates the original data to be analyzed, the arithmetic processor 4 reads the designated original data (Step 101). The arithmetic processor 4 displays the read original data of a three-dimensional chromatogram on a display (not illustrated) communicably connected to the data processing system, and prompts the user to designate an analysis target range (a retention time range and a wavelength range to be analyzed) (Step 102), and further to set the maximum number of the estimated peak components (Step 103). The maximum number of the estimated peak components set by the user is stored in the maximum number storage part 6. The setting of the maximum number of the estimated peak components may be executed before the designation of the analysis target range. After the above, when an execution instruction of the peak estimation processing is input by the user, the arithmetic processor 4 executes the peak estimation processing (Step 104).

Figure 3:
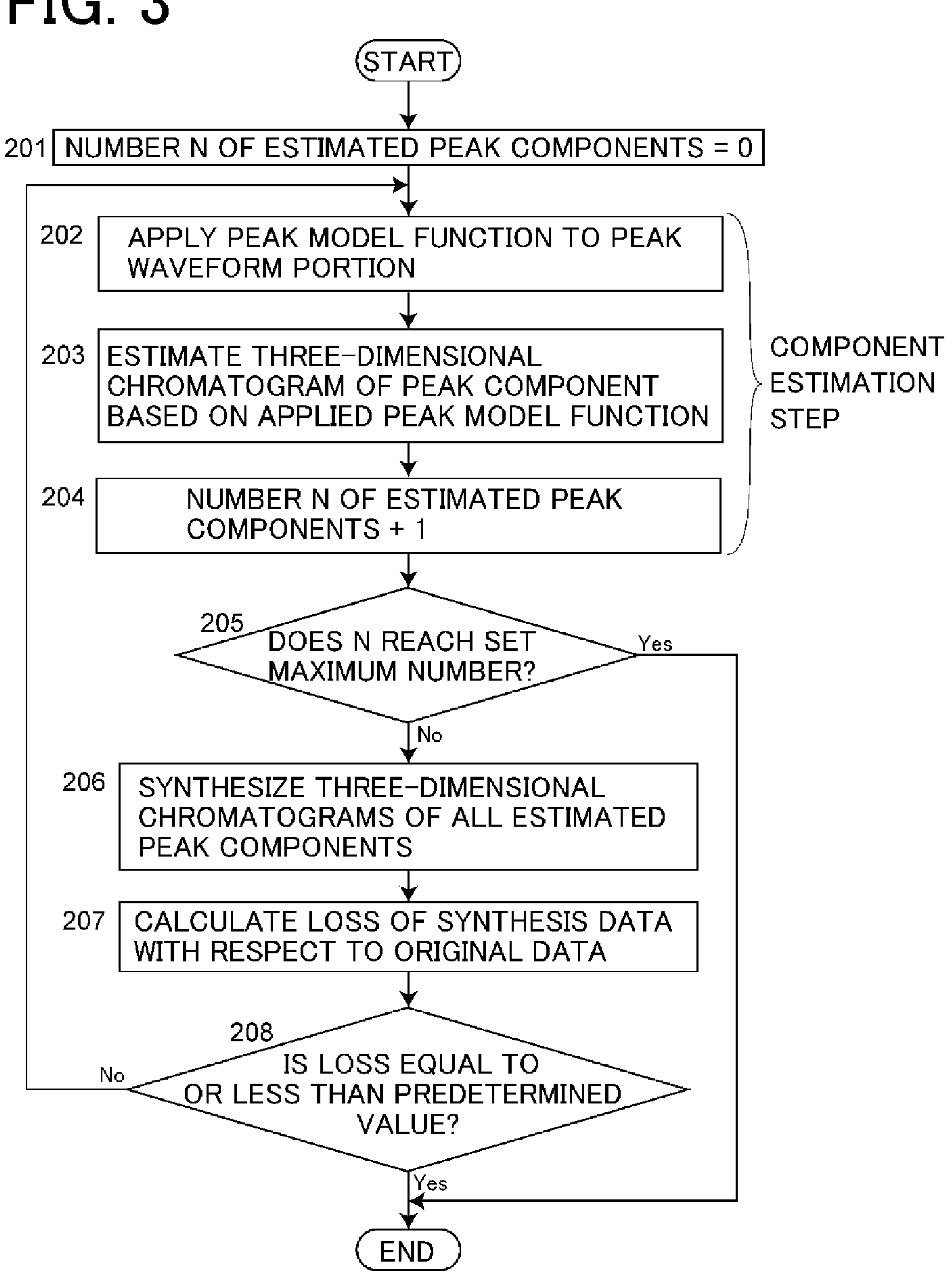
FIG. 3 is a flowchart illustrating an example of operation during the peak estimation processing of the example.

An example of operation during the peak estimation processing will be described with reference to a flowchart of FIG. 3.

At a time point at which the peak estimation processing is started, the number N of the estimated peak components is zero (Step 201). When the peak estimation processing is started, the arithmetic processor 4 executes component estimation steps 202 to 204 for identifying a position and size of one peak estimated to be included in a peak waveform portion that appears in a chromatogram of the analysis target range, using a peak model function prepared in advance. In the component estimation steps 202 to 204, first, a peak model function is applied to a target peak waveform portion while parameters such as a height and a width of the peak model function are adjusted (Step 202). The arithmetic processor 4 estimates a position and size of the peak model function applied to the peak waveform portion as one peak included in the peak waveform portion, and estimates a three-dimensional chromatogram including a chromatogram and a spectrum of the peak component by calculation (Step 203). By the above, the number N of peak components (estimated peak components) for which the three-dimensional chromatogram is estimated is increased by one (Step 204).

After adding one estimated peak component by the component estimation steps 202 to 204, the arithmetic processor 4 determines whether or not the total number N of the estimated peak components reaches a maximum number set in advance (Step 205). If the number N of the estimated peak components does not reach the set maximum number (Step 205: No), three-dimensional chromatograms of all the estimated peak components are combined to create synthesis data (Step 206). The arithmetic processor 4 calculates a loss of the created synthesis data with respect to the original data by using the least squares method or the like (Step 207), and determines whether or not the calculated loss is a predetermined value or less (Step 208). In a case where the loss is equal to or less than the predetermined value (Step 208: Yes), the synthesis data is determined to approximate the original data, and the peak estimation processing is ended.

On the other hand, in a case where the loss of the synthesis data with respect to the original data exceeds the predetermined value (Step 208: No), the arithmetic processor 4 executes the component estimation steps 202 to 204 again and adds one more estimated peak component. After the above, the arithmetic processor 4 determines whether or not the number N of the estimated peak components reaches the set maximum number (Step 205), and in a case where the number N of the estimated peak components reaches the set maximum number (Step 205: Yes), the arithmetic processor 4 ends the peak estimation processing without executing Steps 206 and 207.

Figure 4A:
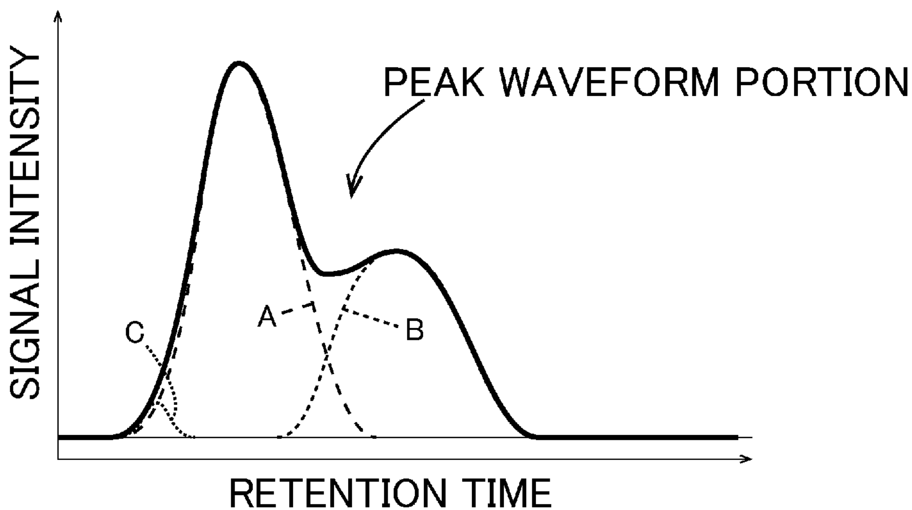
FIGS. 4A and 4B are diagrams for comparing estimation results by the peak estimation processing, where
Figure 4B:
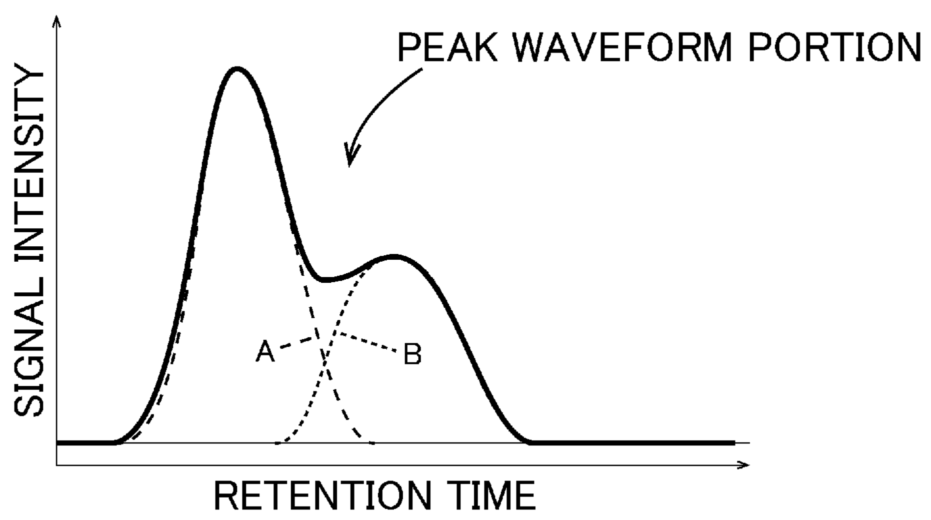

FIG. 4A illustrates an estimation result (comparative example) in a case where the peak estimation processing is executed without setting the maximum number of the estimated peak components, and FIG. 4B illustrates an estimation result in a case where the peak estimation processing is executed by setting the maximum number of the estimated peak components.

When the peak estimation processing is executed without setting the maximum number of the estimated peak components for a peak waveform portion in a certain data range, the component estimation step is repeated until the loss of the synthesis data of the estimated peak component with respect to the original data becomes equal to or less than a predetermined value, and an estimation result that three peaks of a main component A, an accessory component B, and an impurity C are included in a peak waveform portion is assumed to be obtained as illustrated in FIG. 4A. When the peak estimation processing is executed by setting the maximum number of the estimated peak components to two for the peak waveform portion in the same data range, the number of the estimated peak components reaches the set maximum number of two before the loss of the synthesized data of the estimated peak components with respect to the original data becomes a predetermined value or less, and only two peaks of the main component A and the accessory component B are estimated in the peak waveform portion. That is, the presence of a peak of the impurity C is not estimated and is ignored. Further, when the peak estimation processing is executed by slightly changing the data range to be analyzed, in a case where the maximum number of the estimated peak components is not set, the number of estimated peaks may be two or three. However, when the maximum number of the estimated peak components is set to two, the number of estimated peaks is not changed from two.

Note that the example described above merely illustrates an embodiment of the data processing system according to the present invention. The embodiment of the data processing system according to the present invention is as described below.

The embodiment of the data processing system according to the present invention includes an original data storage part that stores original data of a three-dimensional chromatogram including chromatogram data and a spectrum acquired by chromatography analysis, an arithmetic processor configured to execute peak estimation processing of estimating peaks included in a peak waveform portion of the original data stored in the original data storage part by repeating a component estimation step of estimating a three-dimensional chromatogram of one peak component included in the peak waveform portion until synthesis data obtained by synthesizing three-dimensional chromatograms of all estimated peak components of which three-dimensional chromatograms are estimated in the component estimation step approximates the original data, and a maximum number storage part that stores a maximum number of the estimated peak components. The arithmetic processor is configured to end the peak estimation processing regardless of situation of an approximation of the synthesized data with respect to the original data when the number of the estimated peak components reaches the maximum number.

In a first aspect of the embodiment, the arithmetic processor is configured to evaluate a loss of synthetic data of three-dimensional chromatograms of all the estimated peak components with respect to the original data every time the component estimation step is executed until the number of the estimated peak components reaches the maximum number, end the peak estimation processing when the loss satisfies a predetermined condition, and end the peak estimation processing regardless of the loss when the number of the estimated peak components reaches the maximum number.

In a second aspect of the embodiment, the arithmetic processor is configured so that a user can freely set the maximum number.

In a third aspect of the embodiment, the peak waveform portion is included in an analysis target range designated by the user. According to such an aspect, the user can optionally select a peak waveform portion for which to perform the peak estimation processing.

In the third aspect, the peak waveform portion may be a portion in which a plurality of peaks overlap to form one peak waveform. By the above, the user can designate a portion having a shape in which a plurality of peaks are considered to overlap as the analysis target range, and can execute the peak estimation processing for the peak waveform portion.

In a fourth aspect of the embodiment, the arithmetic processor is configured, in the component estimation step, to estimate a position and size of one peak included in the peak waveform portion of the chromatogram by applying a peak model function prepared in advance to the peak waveform portion of the chromatogram while adjusting a parameter of the peak model function in the component estimation step.

DESCRIPTION OF REFERENCE SIGNS

1 data processing system
2 original data storage part

4 arithmetic processor
6 maximum number storage part
100 analysis device

What is claimed is:

1. A chromatograph system comprising a processor and a data memorizing device and configured to process a three-dimensional chromatogram, obtained by chromatography analysis, including chromatogram data and a spectrum, wherein the data memorizing device is configured to memorize original data of the three-dimensional chromatogram and a maximum number of estimated peak components for analyzing the original data, the processor is configured to execute peak estimation processing of estimating peaks included in a peak waveform portion, formed by overlapping a plurality of peaks, of the original data by repeating a peak estimation step, the processor is configured, in the peak estimation processing, to fit the peak waveform portion with a function by assuming a number of components included in the peak waveform portion to estimate peak shapes for the number of components, and to execute a judging step of judging whether the number of components is less than the maximum number of estimated peak components, in a case where it is judged by the judging step that the number of components is less than the maximum number of estimated peak components, the processor is configured to (i) synthesize the estimated peak shapes to form a synthesized peak shape, (ii) subtract the synthesized peak shape from the chromatogram waveform to calculate a difference between the synthesized peak shape and the peak waveform portion, and (iii) compare the difference with a threshold value, in a case where the difference is greater than or equal to the threshold value, the processor is configured to increase the number of components by one and re-execute the peak estimation step, in a case where it is judged by the judging step that the number of components is greater than or equal to the maximum number of estimated peak components of the difference is less than the threshold value, the processor is configured to execute (i) a quantifying step of quantifying concentration of the peak components by calculating areas of the estimated peak shapes and (ii) display a result of the quantifying step on a display after the peak estimation processing is finished.

2. The data processing system according to claim 1, wherein the maximum number of estimated peak components is a number set by a user freely.

3. The data processing system according to claim 1, wherein the peak waveform portion is included in an analysis target range designated by a user.

* * * * *